(12) United States Patent
Gudewer

(10) Patent No.: US 9,631,607 B2
(45) Date of Patent: Apr. 25, 2017

(54) RING GENERATOR

(71) Applicant: Aloys Wobben, Aurich (DE)

(72) Inventor: Wilko Gudewer, Norden (DE)

(73) Assignee: Aloys Wobben, Aurich (DE)

( * ) Notice: Subject to any disclaimer, the term of this patent is extended or adjusted under 35 U.S.C. 154(b) by 0 days.

(21) Appl. No.: 14/681,851

(22) Filed: Apr. 8, 2015

(65) Prior Publication Data

US 2015/0211491 A1 Jul. 30, 2015

Related U.S. Application Data

(62) Division of application No. 13/123,221, filed as application No. PCT/EP2009/062567 on Sep. 29, 2009, now abandoned.

(30) Foreign Application Priority Data

Oct. 8, 2008 (DE) .................. 10 2008 050 848

(51) Int. Cl.
*H02K 9/04* (2006.01)
*H02K 5/20* (2006.01)
(Continued)

(52) U.S. Cl.
CPC ........... *F03D 9/002* (2013.01); *F04D 29/582* (2013.01); *H02K 5/20* (2013.01); *H02K 7/1838* (2013.01);
(Continued)

(58) Field of Classification Search
CPC ...... H02K 9/04; H02K 9/06; F03D 9/00–9/48
(Continued)

(56) References Cited

U.S. PATENT DOCUMENTS 2,810,348 A 10/1957 White
3,684,906 A 8/1972 Lenz
(Continued)

FOREIGN PATENT DOCUMENTS

DE 243208 C 1/1911
DE 44 37 438 A1 11/1995
(Continued)

OTHER PUBLICATIONS

George McPherson, Electrical Machines and Transformers $2^{nd}$ Edition, 1921, p. 1.
(Continued)

*Primary Examiner* — Thomas Truong
(74) *Attorney, Agent, or Firm* — Seed IP Law Group LLP

(57) ABSTRACT

A ring generator of a wind power installation is provided comprising a stator having a peripherally extending stator ring for receiving stator windings and a rotor mounted rotatably about an axis of rotation relative to the stator, wherein the stator ring has cooling passages for cooling the stator by an air flow. A ring generator of a wind power installation is also provided having a stator, a peripherally extending stator ring for receiving stator windings, a rotor mounted rotatably relative to the stator and a stator bell connected to the stator ring for providing a pressure chamber with an increased or reduced pressure for providing an air flow through and/or along the stator and/or rotor for cooling the ring generator, wherein the stator bell has at least one fan opening provided with a fan.

10 Claims, 16 Drawing Sheets

(51) Int. Cl.
*F03D 9/00* (2016.01)
*F04D 29/58* (2006.01)
*H02K 7/18* (2006.01)

(52) U.S. Cl.
CPC .............. *H02K 9/04* (2013.01); *Y02E 10/721* (2013.01); *Y02E 10/722* (2013.01); *Y02E 10/725* (2013.01)

(58) Field of Classification Search
USPC .................................... 310/62, 63, 400–433
IPC ................................................ H02K 9/04,9/06
See application file for complete search history.

(56) References Cited

U.S. PATENT DOCUMENTS

| | | | |
|---|---|---|---|
| 3,916,231 | A | 10/1975 | Cathey |
| 4,370,095 | A | 1/1983 | Sleeper, Jr. |
| 4,631,433 | A | 12/1986 | Stokes |
| 5,557,153 | A | 9/1996 | Zimmermann |
| 6,078,115 | A | 6/2000 | Uchida et al. |
| 6,278,197 | B1 | 8/2001 | Appa |
| 6,676,122 | B1 | 1/2004 | Wobben |
| 6,759,758 | B2 | 7/2004 | Torres Martinez |
| 6,815,849 | B2 | 11/2004 | Serizawa et al. |
| 6,903,466 | B1 | 6/2005 | Mercier et al. |
| 6,921,243 | B2 | 7/2005 | Canini et al. |
| 7,126,235 | B2 | 10/2006 | Bernhoff et al. |
| 7,154,193 | B2 * | 12/2006 | Jansen ............. B63H 21/17 290/44 |
| 7,427,814 | B2 | 9/2008 | Bagepalli et al. |
| 7,431,567 | B1 | 10/2008 | Bevington et al. |
| 7,548,008 | B2 | 6/2009 | Jansen et al. |
| 7,637,715 | B2 | 12/2009 | Battisti |
| 8,053,918 | B2 | 11/2011 | Wobben |
| 2001/0035651 | A1 | 11/2001 | Umemoto et al. |
| 2004/0041408 | A1 | 3/2004 | Casazza |
| 2005/0082836 | A1 | 4/2005 | Lagerwey |
| 2007/0103027 | A1 | 5/2007 | Jansen et al. |
| 2008/0197638 | A1 | 8/2008 | Wobben |
| 2011/0260467 | A1 | 10/2011 | Gudewer |

FOREIGN PATENT DOCUMENTS

| | | |
|---|---|---|
| DE | 44 313 61 A1 | 3/1996 |
| DE | 196 08 286 A1 | 8/1997 |
| DE | 196 36 591 A1 | 3/1998 |
| DE | 102 33 947 A1 | 2/2004 |
| DE | 102 46 690 A1 | 4/2004 |
| DE | 10 2004 046 700 A1 | 4/2006 |
| DE | 600 21 492 T2 | 5/2006 |
| DE | 600 29 977 T2 | 3/2007 |
| DE | 10 2008 050 848 A1 | 4/2010 |
| EP | 1 586 769 A2 | 10/2005 |
| EP | 1 641 101 A1 | 3/2006 |
| EP | 1 837 519 A2 | 9/2007 |
| EP | 1 988 282 A2 | 11/2008 |
| ES | 2 156 706 A1 | 7/2001 |
| FR | 1 233 089 A | 10/1960 |
| JP | 54096707 A | 7/1979 |
| JP | 58-65977 A | 4/1983 |
| JP | 58-127546 A | 7/1983 |
| JP | 59/222055 A | 12/1984 |
| JP | 2002-013467 A | 1/2002 |
| JP | 2008-513665 A | 5/2008 |
| JP | 2008-187792 A | 8/2008 |
| JP | 2008187792 A * | 8/2008 |
| SU | 1638769 A1 | 3/1991 |
| WO | 2008/061943 A1 | 5/2008 |

OTHER PUBLICATIONS

"Emeuerbare Energien," Abschlussbericht der Technischen Versicherer im GDV, Mar. 2003, 9 pages.

* cited by examiner

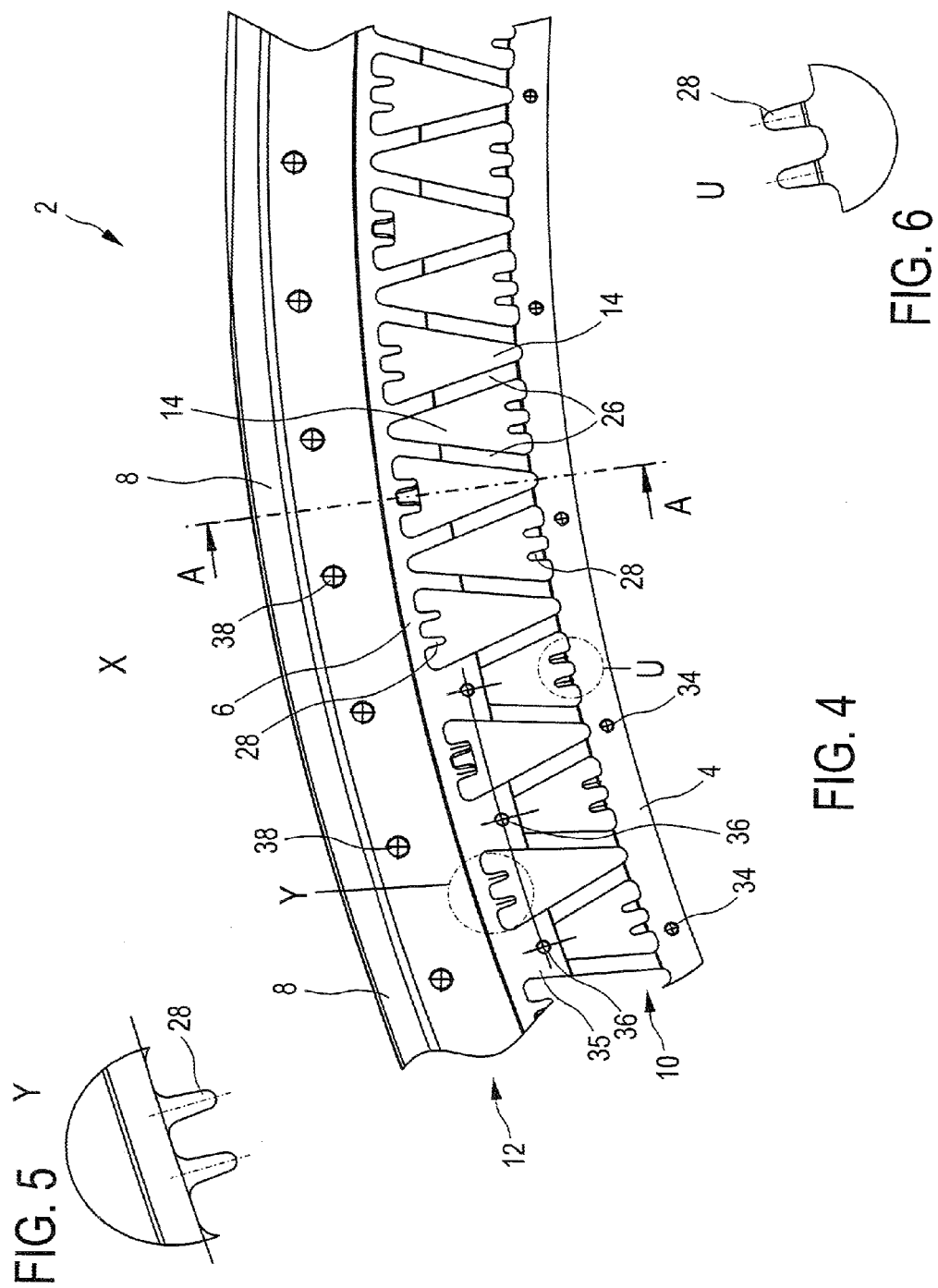

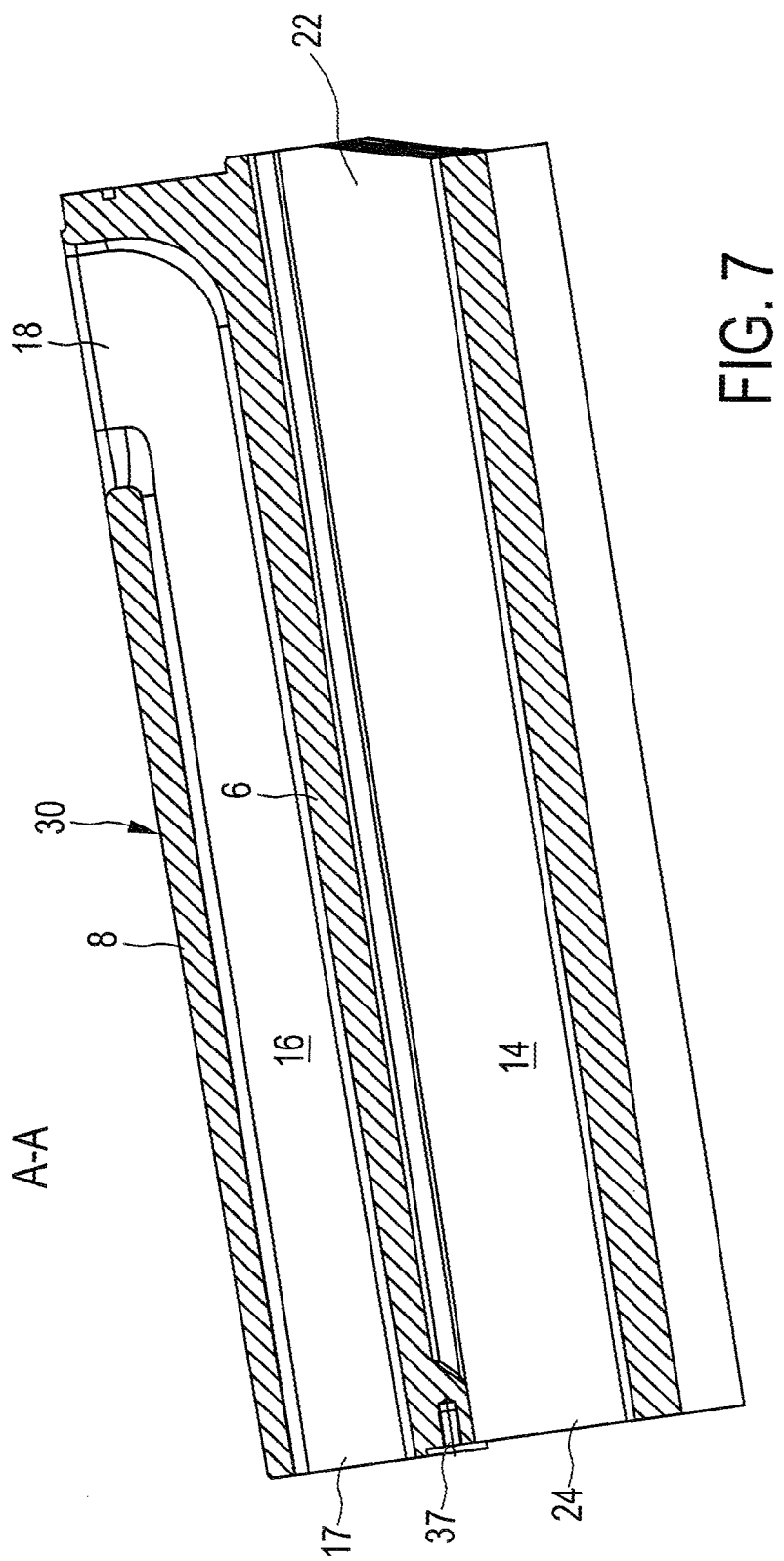

RING GENERATOR

BACKGROUND

Technical Field

The present disclosure concerns a ring generator of a wind power installation. In addition the present disclosure concerns a method of controlling a wind power installation and further concerns a wind power installation.

Description of the Related Art

A wind power installation converts mechanical work taken from the wind into electric energy by means of an electric generator. In that respect a ring generator is a slowly rotating generator which manages without a transmission between the rotor of the generator and the mechanical rotor assembly which has rotor blades. For that purpose the ring generator has a multiplicity of poles. The number of poles can be of the order of magnitude of 20 up to 84 poles and even more. In that respect the ring generator is of a comparatively large diameter in comparison with its axial extent. For example the ring generator of a modern wind power installation of 7 or more megawatts nominal power is of a diameter at the air gap of about 10 m whereas the extent of the air gap in the axial direction is in the region of 1 m. In that respect, as is known, the air gap is the intermediate space between the stator and the rotor of an electric generator. The rotor and/or the stator substantially assume the shape of a ring, which is thought to be the reason for identifying it as a ring generator.

Because of the slow speed of rotation of a rotor of a ring generator of a wind power installation, which can be in the range of about 5 to 50 and in particular 10 to 30 revolutions per minute as the nominal rotary speed, self-cooling by a propeller which is mechanically fixedly connected to the rotor is out of the question or is at least of little efficiency. In comparison therewith attention is directed to other generators which are used in wind power installations together with a step-up transmission and involve nominal rotary speeds in the region of some thousand revolutions per minute. Solutions in respect of such generators cannot be applied to slowly rotating ring generators.

DE 196 36 591 A1 discloses a generator for transmissionless wind converters in the form of an external rotor. There the entire magnetically operative part of the generator is arranged outside a wind power installation pod. An external rotor is especially proposed for reasons of cooling, wherein the rotor is arranged outside the stator, in a radial view. Carrier arms extend from the mounting arranged within the stator, to the externally arranged rotor. Those carrier arms of the rotor are at the same time in the form of vanes to convey cooling air into cooling passages of the stator. Such a structure however is extremely complicated and expensive.

DE 10 2004 046 700 B4, for a wind power installation with a ring generator in the form of an internal rotor, proposes urging air into the pod and through the ring generator air gap by a fan in the pod casing in order thereby to cool the ring generator.

As further general state of the art attention is to be directed to the following documents: DE 102 46 690 A1; DE 600 21 492 T2; DE 196 08 286 B4; DE 600 29 977 T2; EP 1 837 519 A2 and DE 102 ×947 A1.

To increase the cooling of a ring generator the stator and in particular the stator ring can be prepared for water cooling, in particular for guiding a flow of water. A disadvantage in that respect however is that the use of water cooling basically entails the risk of corrosion, in particular for a metallic article such as the stator ring.

BRIEF SUMMARY

According to one embodiment, cooling of a ring generator is improved, and made more efficient.

A ring generator as set forth in claim 1 is disclosed herein.

According to one embodiment, a ring generator of a wind power installation which converts mechanical work taken from the wind into electric energy has a stator and a rotor mounted rotatably about an axis of rotation relative to the stator. As used in describing the ring generator of the present invention, the term rotor as used herein refers to the electrically active component that rotates closely adjacent to the stator and cooperates therewith to produce electricity and does not refer to the mechanical rotor assembly of a wind power installation which is composed of a rotor assembly hub and at least one and usually three rotor blades. The use of the term rotor is in no way intended to limit the type of generator used. Preferably, however, a synchronous generator is used.

The stator has substantially a peripherally extending stator ring for receiving a laminated core having stator windings. A rotary movement of the rotor relative to the stator generates an alternating magnetic field in the laminated core, which in turn leads to a flow of current in the stator windings and results in an increase in the temperature of the stator, due to losses.

The stator ring has cooling passages for cooling the stator by an air flow. Additional air cooling is thus provided. Such cooling passages can be provided both for active cooling and also for passive cooling or for a combination of both. In the case of active cooling therefore an artificial air flow is generated for cooling purposes.

According to embodiments of the invention, the ring generator is in the form of an internal rotor. Accordingly, the rotor rotates within the stator. For example the air gap between the rotor and the stator is substantially in the form of a—short—cylinder shell. That would also embrace an arrangement in which the air gap in the axial direction is of a slightly decreasing or increasing diameter and thus equates to a portion of a cone. In particular in that respect the rotor is arranged in the form of a ring radially within the stator which is also in the form of a ring. The stator is arranged fixedly in the form of an outer ring.

Preferably at least some cooling passages are provided for active cooling by a forced air flow and alternatively or at the same time some cooling passages are provided for passive cooling by the wind. In particular there is provided a device which produces an air flow and the cooling passages in question, for active cooling, have an opening for the intake and outlet flow of the air flow in question. Preferably some cooling passages can be provided for active cooling and others for passive cooling.

In addition there is proposed a stator bell connected to the stator, for providing a pressure chamber involving an increased or a reduced pressure for providing an active air flow through and/or along the stator and/or rotor for cooling the ring generator. Such a stator bell thus encloses a region adjacent to the ring generator and adjoining same, in which an increased pressure of air is produced and that air can escape through portions in the ring generator, in particular through cooling passages in the stator ring and/or through the air gap, so that a cooling air flow is produced. The stator bell has a peripherally extending, in particular circular, fixing portion for fixing to the stator, in particular the stator ring. In other respects the precise form of the stator bell is basically not an important consideration.

In an embodiment the stator ring, relative to the axis of rotation, has an inner ring portion for active cooling and an outer ring portion for passive cooling and the stator bell is so fixed to the stator ring that only the inner ring portion has the active cooling air flow flowing thereto. In particular the stator bell, with respect to the radial direction, is fixed in a circular fixing portion between the inner and the outer ring portions. The inner ring portion is thus arranged substantially within the stator bell and thus exposed to the pressure chamber of the stator bell, whereas the outer ring portion is arranged outside the stator bell. An air flow produced through the pressure chamber in the stator bell thus reaches only the inner ring portion.

In other respects it is to be pointed out that basically a reduced air pressure can also be produced in the stator bell in order to suck in air through openings in the ring generator towards the stator bell.

Preferably, the stator bell is provided to carry the stator ring which in turn carries the laminated core having the stator windings. In that case the stator bell can be fixed to the stator ring and to a machine carrier in the wind power installation. In that case the stator ring would be fixed to the machine carrier by way of the stator bell. In other respects, however, the stator bell is not limited to a bell-shaped configuration but can also assume a general cowling form or the like.

In a further configuration, at least one fan opening having a fan is provided in the stator bell. Air can be blown into the pressure chamber by such a fan in order to produce the air flow through and/or along the stator and/or the rotor for cooling the ring generator. Alternatively, such a fan can also provide for a reduced air pressure in the pressure chamber to produce an oppositely directed air flow. Two or more fans can equally be provided in the stator bell.

Preferably, some or all cooling passages extend axially with respect to the axis of rotation. Thus, the ring generator is at least partially prepared for cooling air flows in the axial direction.

Preferably, a plurality of cooling passages is arranged concentrically around the axis of rotation and forms at least one ring-shaped cooling region.

In a further embodiment the ring generator is characterized in that the stator ring has in the radial direction relative to the axis of rotation an inner and an outer and optionally a central stabilizing carrier ring, a circular cooling region being provided between two carrier rings. The stator ring is thus divided into stabilizing and cooling regions. There are at least two carrier rings, between which there is a basically also a ring-shaped cooling region. When using a central carrier ring it is also possible to provide two ring-shaped cooling regions, namely one between the central and outer carrier rings or the other between the central and inner carrier rings. The carrier rings are each substantially solid. The laminated core or other regions which are good magnetic conductors are also fixed to the inner carrier ring.

The above-mentioned two or three carrier rings are in that case preferably and in particular produced together with the cooling regions arranged therebetween from one piece, such as, for example, by casting. The carrier rings which could also be referred to as carrier ring portions are intended to provide substantially for stiffening of the stator ring. When using the central stabilizing carrier ring the stator bell is desirably fixed to the central stabilizing carrier ring whereby the stator ring can be carried by the stator bell. In that case the stator bell engages the stator ring at the central carrier ring for carrying purposes.

The use of three carrier rings and overall two ring-shaped cooling regions arranged therebetween provides different cooling stages and temperature ranges. An inner ring-shaped cooling region is closer to the laminated core and thus the heat source and will involve correspondingly higher temperatures than the correspondingly outer ring-shaped cooling region. Any stresses which can occur due to the high temperature in the inner ring-shaped cooling region can be absorbed by the outer ring-shaped cooling region. Accordingly, in the case of the inner ring-shaped cooling region it would be necessary to reckon on a great deal of heat and relatively great expansion, whereas in the case of the outer ring-shaped cooling region there is to be reckoned on less heat and correspondingly less expansion. In that case the outer ring-shaped region holds the inner ring-shaped region and possibly limits the expansion thereof.

In an embodiment it is proposed that adjacent cooling passages of a cooling region are delimited relative to each other by boundary walls and the boundary walls form connecting limbs between adjacent stabilizing carrier rings and/or two adjacent carrier rings are connected together by cooling ribs. That provides, between two adjacent stabilizing carrier rings, a structure which on the one hand connects the carrier rings in question and at the same time divides up cooling passages. Such connecting structures or connecting limbs can at the same time perform the function of cooling ribs. Those inner cooling ribs can basically be of any desired configuration. Besides a straight configuration, it is also possible to envisage S-shaped, winding and other shapes.

It is desirable if at least one and preferably all cooling passages of at least one cooling region are of a triangular shape in axial cross-section and/or each two adjacent cooling passages together form in axial cross-section the shape of a parallelogram, in particular a rhombus, and/or the cooling passages have at least one cooling rib facing towards the inside of the cooling passage. Such a triangular shape affords a simple possible design option which at the same time is also stable. The same applies to the rhombus shape of two cooling passages, which is afforded in particular by suitably fitting together two triangular cooling passages. The provision of cooling ribs in the inside of the cooling passage can promote cooling by an air flow through the cooling passage in question.

In a further embodiment it is proposed that the stator ring is segmented and in particular is composed of two, three, four or more substantially symmetrical circular segments. For example the stator ring can be composed of three 120° segments. Such segments are basically simpler to produce and/or transport. Particularly in the case of stator rings of a diameter in the region of 10 m, handling can be considerably simplified by virtue of segmentation.

In an embodiment it is proposed that at least in the region of the cooling passages the stator ring is made from aluminium and/or an aluminium alloy and/or is cast from a material. Aluminium has a high temperature conductivity and is therefore preferably provided in the region of the cooling passages and thus in cooling regions. In addition aluminium is basically corrosion-resistant and can thus also be provided for contact with moist external air or the like. An alloy can be used to influence properties of the material in particular in regard to thermal conductivity, corrosion resistance and stability.

The stator ring or a region thereof is preferably cast from a material that is intended to make it possible to easily and reproducibly provide specific passage configurations and other shapes. At least in the region of the cooling passages and/or the or some carrier rings it is possible to provide for casting of the portion in question. Segmentation can also be effected by, for example, casting individual segments like 90° or 120° segments.

A further embodiment proposes that there are provided passive cooling passages having a respective intake flow opening facing in the axial direction and an outlet flow opening at least partially facing radially outwardly. Such passive cooling passages can thus receive an afflux flow in the radial direction, for example, with wind, whereby the wind flows into the intake flow openings and flows out of the passive cooling passages again turned at least partially radially outwardly. A suction effect is achieved by the radially outwardly facing outlet flow openings. The fact that the passive cooling passages have an intake and an outlet flow opening and are thus in the form of partially closed passages can provide for an increase in the stability of the stator ring. In principle the outlet flow openings can also face in the axial direction.

Preferably, the outlet flow opening is thus provided as a suction opening. Preferably, that effect can be still further enhanced or promoted by the stator ring having a curved surface in the axial direction in the region of the outlet flow opening. Such a convex curvature can produce a suction effect, similarly to an aircraft airfoil, and that effect could thus act on the outlet opening and increase the air flow through the passive cooling passage.

In addition, according to embodiments of the invention, there is proposed a ring generator of a wind power installation having a stator ring for receiving stator windings and a rotor mounted rotatably relative to the stator. There is further provided a stator bell which is connected to the stator ring and which provides a pressure chamber having an increased or reduced pressure for providing an air flow through the stator and/or rotor for cooling the ring generator, wherein the stator bell has at least one fan opening provided with the fan and the fan is mounted movably by means of a motion mechanism or is fixed by a quick-action clamping device to temporarily open the fan opening for maintenance purposes and/or to allow a person to pass. The stator bell is thus fixed to the stator ring and an increased pressure is produced by the at least one fan in the stator bell adjacent to the stator rotor arrangement, the reduced pressure escaping in the form of an air cooling flow or flows through openings in the rotor stator arrangement, such as, for example, through the air gap. In order now to avoid the provision of an extraordinary opening in the stator bell and nonetheless to provide access to the rotor assembly-stator arrangement, at least one fan is mounted movably by means of a motion mechanism. That fan can thus be folded away, pivoted away, pushed away or turned away or moved in some other fashion so that the corresponding fan opening in the stator bell is then free and as a result is clear for maintenance purposes and/or to allow a person to pass. The fan in question and any further fans are naturally switched off for such maintenance purposes.

Preferably, the motion mechanism is in the form of a pivotal mechanism. The fan can thus be easily pivoted away from its fan opening and only needs to be arrested in the respective opened or closed position.

In an embodiment, the ring generator is characterized in that the stator bell has a first fixing portion for fixing to a machine carrier of a wind power installation and a plurality of carrier portions, in particular carrier arms, which extend therefrom outwardly in a star-shaped arrangement to a second fixing portion for fixing to the stator ring so that the stator ring can be carried on the machine carrier by way of the carrier portions. With respect to a radial direction, the first fixing portion is thus an inwardly arranged portion and the second fixing portion is an outer fixing portion. The carrier portions, in particular carrier arms, extend in a star configuration from the inner to the outer carrier portion and in that way substantially stretch across the stator bell. Provided between the carrier portions or carrier arms are cover portions such as connecting regions to close the stator bell. Fan openings with fans can be provided in particular in those connecting regions. Admittedly, the intermediate regions also stabilize, but nonetheless the carrier portions or carrier arms substantially perform the function of holding the stator ring. The stator bell can thus perform two functions at the same time, namely carrying the stator ring and at the same time delimiting a pressure chamber involving an increased or a reduced pressure for providing an air flow. The intermediate regions make it possible to achieve in particular enhanced torsional stiffness.

Preferably, the stator bell is cast in one piece, preferably from a metal, in particular cast iron, preferably cast iron with spheroidal graphite, which is also known as spheroidal iron, or abbreviated as GJS or earlier as GGG—which signifies globular cast iron. In that way it is possible to achieve a large number of shapes which can be produced a number of times by re-using the corresponding mould. The preferred material has good mechanical properties, is inexpensive to produce and can be well worked.

A ring generator can in principle have any of the described features and any combinations of features are basically possible. In particular, a ring generator with a stator bell with a movably mounted fan can be combined with features of a ring generator having a stator ring with cooling passages for cooling the stator by at least one air flow. Equally the reverse case is possible, where a ring generator with a stator ring with cooling passages can be combined with features of a ring generator with a stator bell with a movably mounted fan. That combination option also concerns the further features described in accordance with one or more embodiments.

Preferably, the ring generator has a nominal power of at least 30 kW, preferably at least 300 kW and still more preferably at least 1 MW. The ring generator is thus suitable from the point of view of nominal power to be used for modern wind power installations.

According to embodiments of the invention, there is proposed a method of controlling a wind power installation having a ring generator having a rotor and a stator. An electric power generated by the ring generator is firstly detected. Such detection can be effected by direct power measurement, such as, for example, at the stator windings, or it is possible to implement indirect measurement by way of characteristic measurement values, such as, for example, measurement of the rotary speed and/or the pitch angles of the rotor blades and/or internal computing parameters which a control computer has in any case available. Temperature measurement can also provide information about the electric power generated.

Next, at least one fan installed in a stator bell is switched on to produce an air flow through and/or along the stator and/or the rotor for cooling the ring generator if the detected electric power reaches and/or exceeds a predetermined value. Thus, active cooling which requires additional power is initiated only when corresponding power losses and thus corresponding thermal loadings are to be expected by virtue of the electric power generated. It is to be noted that control of the wind power installation is otherwise effected in the manner known to one skilled in the art.

Preferably, a value of or above 30%, preferably 50% and further preferably 80% of the nominal power of the wind power installation is established as the predetermined value. In one particular embodiment, the nominal power itself is selected as the predetermined value. Accordingly, active cooling is switched on only at full load or shortly before the same and active cooling is possibly not effected at part load.

Preferably, the control method according to embodiments of the invention is used for one of the ring generators according to aspects of the invention and/or for a ring generator according to at least one of the described embodiments.

According to embodiments of the invention, in addition there is proposed a wind power installation comprising a pod and one of the ring generators according to aspects of the invention, in particular according to one of the described embodiments.

Preferably, in some embodiments, a wind power installation is characterized in that the ring generator is arranged within the pod except for an outer portion of the stator ring and the outer portion of the stator ring is arranged outside the pod to receive the afflux flow of wind. The pod also includes the hub casing which rotates with the rotor assembly in operation of the wind power installation. The hub casing is also referred to as the spinner. In that way the ring generator is substantially in the pod and is accordingly substantially protected from the influences of the weather. Cooling of the ring generator can already be achieved passively or actively within the pod for example by means of cooling passages and/or by using a suitable stator bell. It is additionally proposed that an outer portion of the stator ring is arranged in particular with a passive cooling region, outside the pod. In particular that affords a ring portion which projects somewhat beyond the pod casing and which can receive the afflux flow of wind for cooling purposes. The particular consideration in that respect is also that it is possible to use the flow of wind around the pod directly for cooling the generator. In that respect the cooling effect depends partially on the prevailing wind speed. A high level of cooling is thus achieved with a strong wind in the full-load range, whereas lesser cooling is achieved in the part-load range and thus when the wind is light and thus cooling is at least partially automatically adapted according to the respective needs involved.

An outer portion of the stator ring preferably has cooling means, in particular cooling passages for passive cooling, those cooling means being directly exposed to the wind. In that outer portion therefore the ring generator can directly give off heat to the wind flowing thereto. It is pointed out that such a situation generally relates to a wind power installation in operation, which is turned into the wind.

Preferably, the pod is of an aerodynamic configuration in order to receive the afflux flow of the wind in substantially laminar fashion—if the pod is turned into the wind—, in order also to have wind in the region of an outer portion of the stator ring. Such an aerodynamic configuration can be achieved for example by a substantially approximately drop-shaped or egg-shaped form and/or an oval form in side view and/or by a form which is substantially rotationally symmetrical with respect to the axis of the rotor assembly.

It is desirable to provide flow means outside the pod, which promote a flow of wind in the region of the outer portion of the stator ring. For example, there can be provided a guide plate for guiding the wind or it is possible to provide for the configuration of a wind tunnel-like flow means.

The invention is described in greater detail hereinafter by means of embodiments by way of example with reference to the accompanying Figures. Any directional references relate to the wind direction in regular use. Thus, "from the front" signifies viewing from the point of view of the afflux wind and so forth.

BRIEF DESCRIPTION OF THE SEVERAL VIEWS OF THE DRAWINGS

FIG. 4 shows a partial detail view of the portion X shown in FIG. 2.

FIG. 5 shows a partial detail view of the portion Y shown in FIG. 4.

FIG. 6 shows a partial detail view of the portion U shown in FIG. 4.

FIG. 7 shows a cross-sectional view of a section through the stator ring taken along line A-A of FIG. 4.

DETAILED DESCRIPTION

It is to be noted that the same references can denote possibly similar, non-identical elements of different embodiments.

Figure 1:
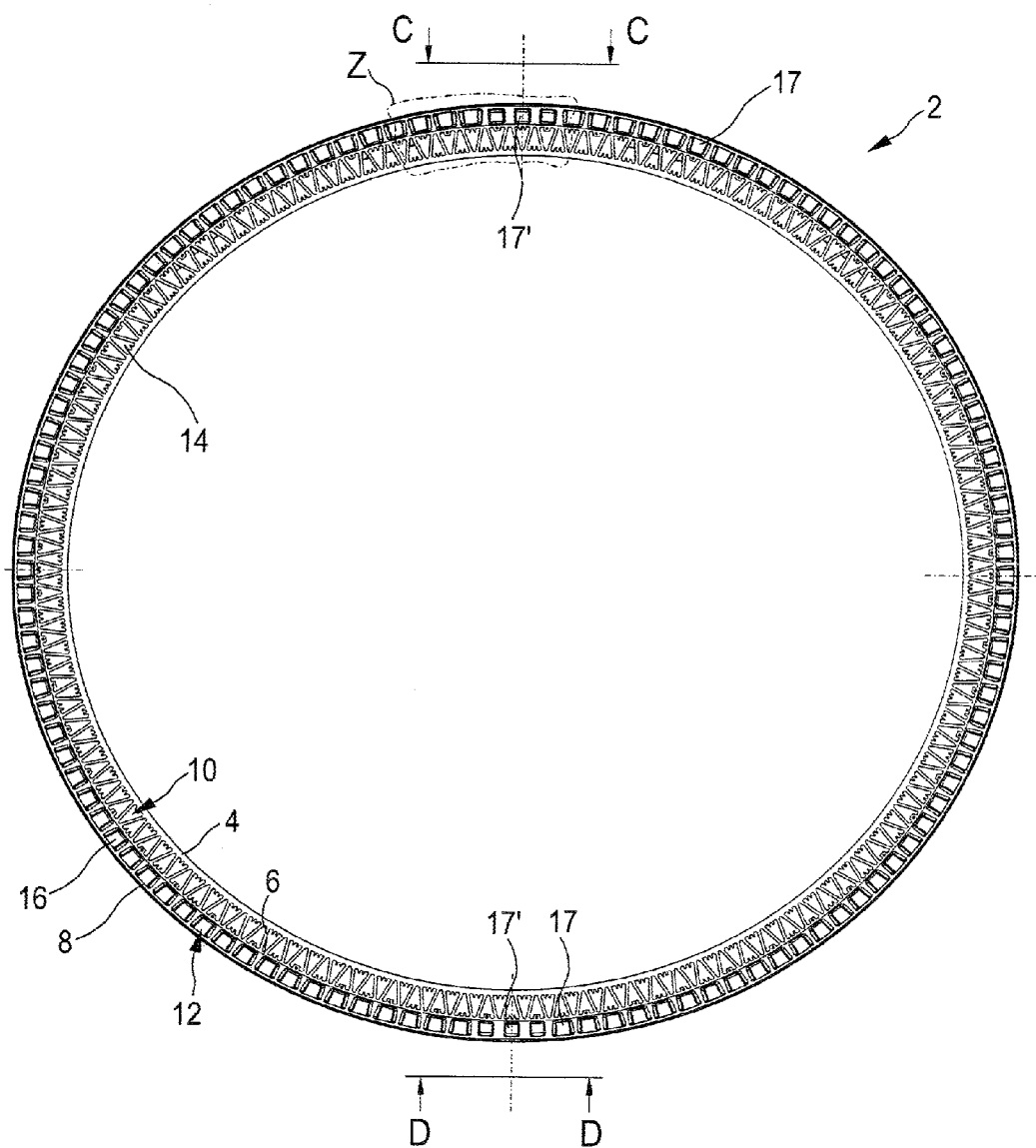
FIG. 1 shows a front elevation view of a stator ring of a wind power installation, according to one embodiment.

The stator ring 2 shown in FIG. 1 is of a ring-shaped configuration and forms a part of a ring generator with an internal rotor. The stator ring 2 has an inner carrier ring 4, a central carrier ring 6 and an outer carrier ring 8. Provided between the inner and outer carrier rings 4, 6 is an active cooling portion 10 while a passive cooling portion 12 is provided between the central and outer carrier rings 6, 8. As illustrated, the stator ring 2 is cast in one piece including the inner, central and outer carrier rings 4, 6, 8 and active and passive cooling portions 10, 12, the material used being aluminium.

The inner, central and outer carrier rings 4, 6, 8 provide for stability and stiffness by virtue of their substantially solid nature. To guide a magnetic field, a suitable magnetically well-conductive laminated core carrying stator windings is to be arranged inwardly on the inner carrier ring 4. The laminated core can be fixedly carried by virtue of its fixing to the inner carrier ring 4. Then, in the appropriate manner, an internal rotor is to be arranged mounted rotatably relative to the stator within that laminated core. Heat from the laminated core can be delivered directly to the ambient air, but heat is primarily delivered by way of the carrier ring 4 to the active cooling portion 10 and the passive cooling portion 12. The active cooling portion 10, for delivering heat, then has a plurality of active cooling passages 14 which are of a substantially triangular configuration in the active cooling portion 10 between the inner and central carrier rings 4, 6. Further heat can be discharged by way of the passive cooling passages 16 which are approximately square or trapezoidal in cross-section.

The stator ring 2 is approximately of an outside diameter of 5 m. The axial extent is about 90 cm.

Figure 2:
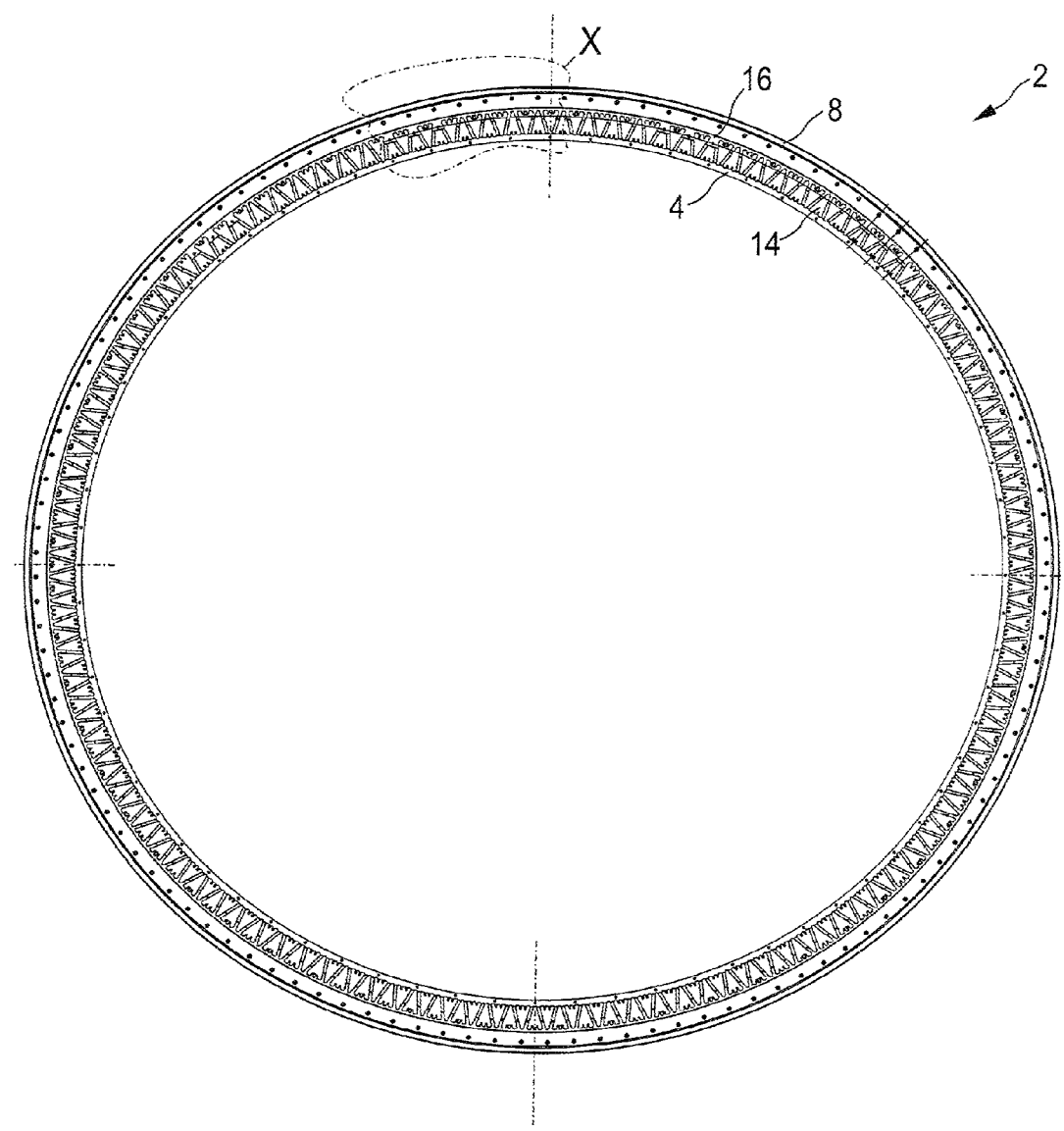
FIG. 2 shows a rear elevation view of the stator ring of FIG. 1.

The passive cooling passages 16 each have a radially outwardly directed outlet flow opening so that only the active cooling passages 14 can be seen in the rear view shown in FIG. 2.

Figure 3:
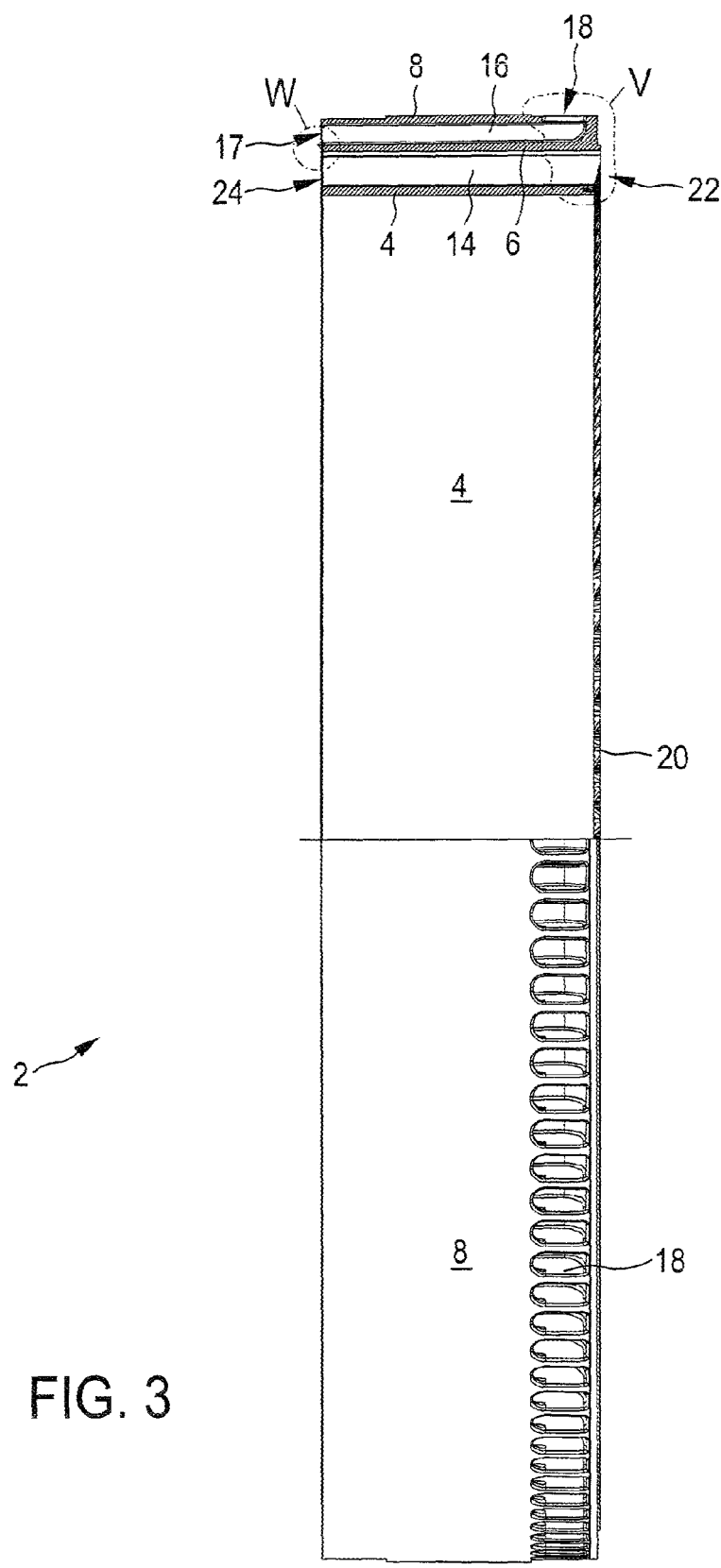
FIG. 3 shows a side elevation view of the stator ring of FIG. 1, with a partial cross-section thereof.

Radially outwardly directed outlet flow openings 18 are to be seen from the side view in FIG. 3 in accordance with the non-sectioned illustrated portion which is shown at the bottom in FIG. 3. Besides a bevelled edge 20 of the inner carrier ring 4, the sectioned region shows a view in axial section illustrating the shape of the active and passive cooling passages 14, 16. In that case the active cooling passages 14 extend substantially axially from an inlet region 22 to an outlet region 24. The passive cooling passage 16 extends from an intake flow opening 17 to the outlet flow opening 18. The passive cooling passage 16 also extends substantially in the axial direction, with the outlet flow opening 18 being directed radially outwardly. In addition the inlet region 22 of the active cooling passage 14 is disposed on the side of the stator ring 2, that is opposite to the intake flow opening 17 of the passive cooling passage 16. Accordingly the stator ring 2 is also adapted to provide that an active air flow through the active cooling passages 14 is directed in substantially opposite relationship to a passive air flow through the passive cooling passages 16.

Nonetheless those flow directions are not obligatory and an air flow could also be guided by suitable devices in a direction other than the above-described direction, at least through the active cooling passages 14.

In particular the cross-section of the active cooling passages 14 or their respective inlet region 22 can be seen from the portion illustrated on an enlarged scale in FIG. 4. In that case the active cooling passages 14 are of a substantially triangular configuration in cross-section, being arranged alternately with a differing orientation so that two adjacent active cooling passages 14 together in cross-section approximately assume the shape of a parallelogram. In a corresponding fashion a respective boundary wall is arranged between each two active cooling passages 14, wherein there are always two boundary walls 26 of an active cooling passage 14 inclined relative to each other.

The boundary walls 26 thus subdivide the active cooling passages 14 relative to each other and thus serve at the same time as cooling ribs. In addition they afford a stable arrangement, in particular a stable connection between the inner carrier ring 4 and the central carrier ring 6 by virtue of the alternately inclined arrangement.

Furthermore additional cooling means of a limb-like configuration or cooling ribs 28 are provided in the active cooling passages 14, being shown on an enlarged scale in FIGS. 5 and 6 respectively.

The cooling ribs 28 thus increase the cooling area in the active cooling passage 14 without noticeably impeding an air flow.

For fixing purposes inner carrier ring bores 34 are provided on the inner carrier ring 4. In a corresponding fashion central carrier ring bores 36 are provided in the region of the central carrier ring 6 and in the region of the passive cooling portion 12 adjacent to the outer carrier ring 8 the stator ring 2 has outer carrier ring bores 38. At least some of the bores 34, 36 and 38 are provided with a screwthread and can be used for fixing purposes. The outer carrier ring bores 38 serve for fixing the stator ring 2 to a stator bell.

The central carrier ring bores 36 are provided at some locations on the carrier ring by auxiliary surfaces 35, more specifically three bores at each of four locations. They serve for fixing cables.

FIG. 7 is a cross-sectional view showing how a passive cooling passage 16 is arranged between the outer carrier ring 8 and the central carrier ring 6. In this case the passive cooling passage 16 extends from the intake flow opening 17 to the outlet flow opening 18. An air flow can thus flow substantially in the axial direction in through the inlet opening 17 and flow out at the end through the radially outwardly directed outlet flow opening 18. In this case a side of the outer carrier ring 8, that is remote from the passive cooling passage 16, is an outside 30 of the stator ring 2. In accordance with the appropriate requirements therefore air flows along both sides of the outer carrier ring 8, namely on the inside through the active cooling passage 16 and on the outside along the outside 30.

The active cooling passage 14 is provided between the central carrier ring 6 and the inner carrier ring 4. It extends from the inlet region 22 to the outlet region 24. The central carrier ring 6 also has blind holes 37 serving for fixing a rain gutter.

Figure 8:
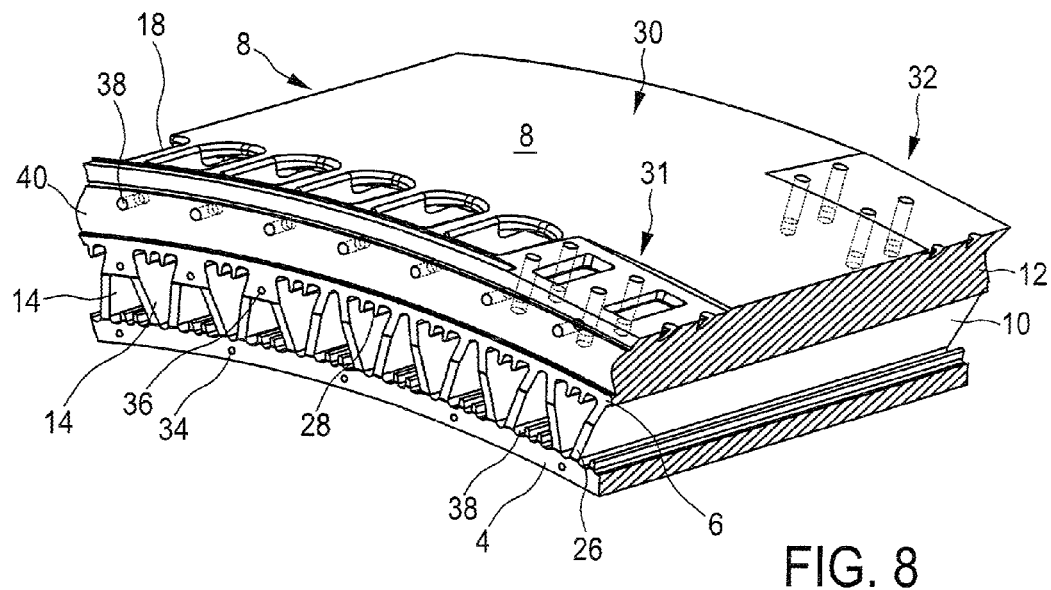
FIG. 8 shows a perspective view of the portion X shown in FIG. 4.
Figure 12:
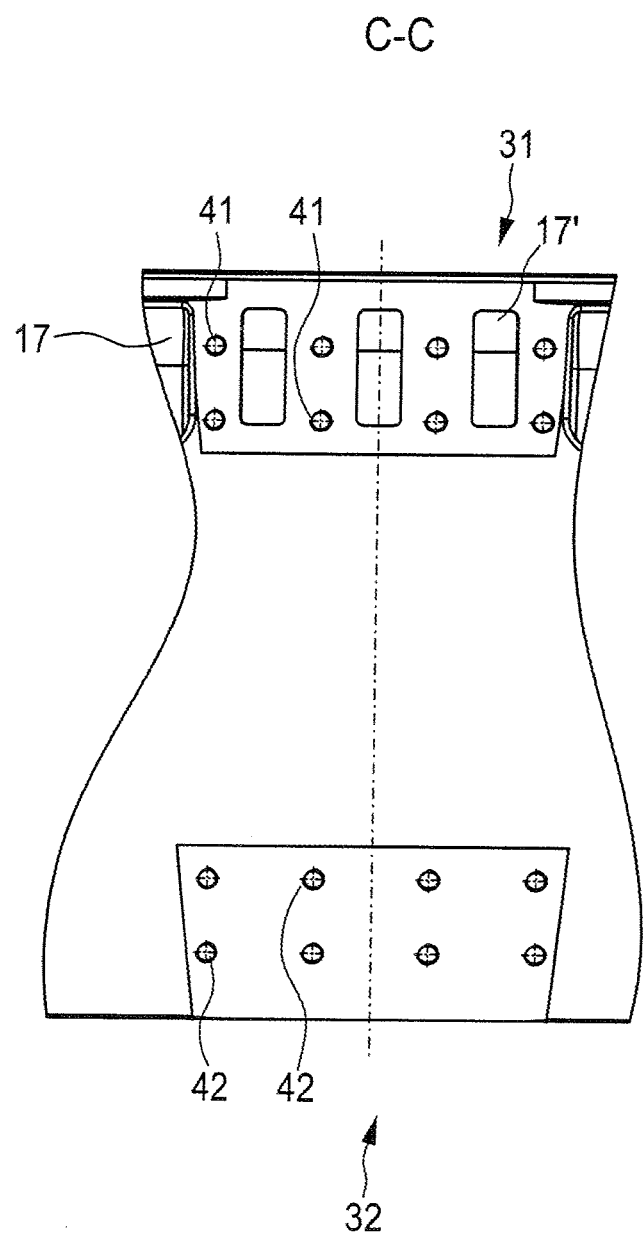
FIG. 12 shows a portion of a top plan view of the stator ring as shown in FIG. 1 as indicated in FIG. 1 by the line C-C.

The perspective view in FIG. 8 shows external fixing regions 31 and 32 at the leeward and windward sides respectively, which are only partly shown and which are described in greater detail hereinafter with reference to FIG. 12.

FIG. 8 also shows how the passive cooling passages 16 open towards the outside 30 through their outlet flow openings 18. The fact that the outlet flow openings 18 are directed radially outwardly means that an end portion 40 in which the outer carrier ring bores 38 are arranged is afforded downstream of the passive cooling passages 16, as viewed from the appropriate wind direction in operation.

Figure 9:
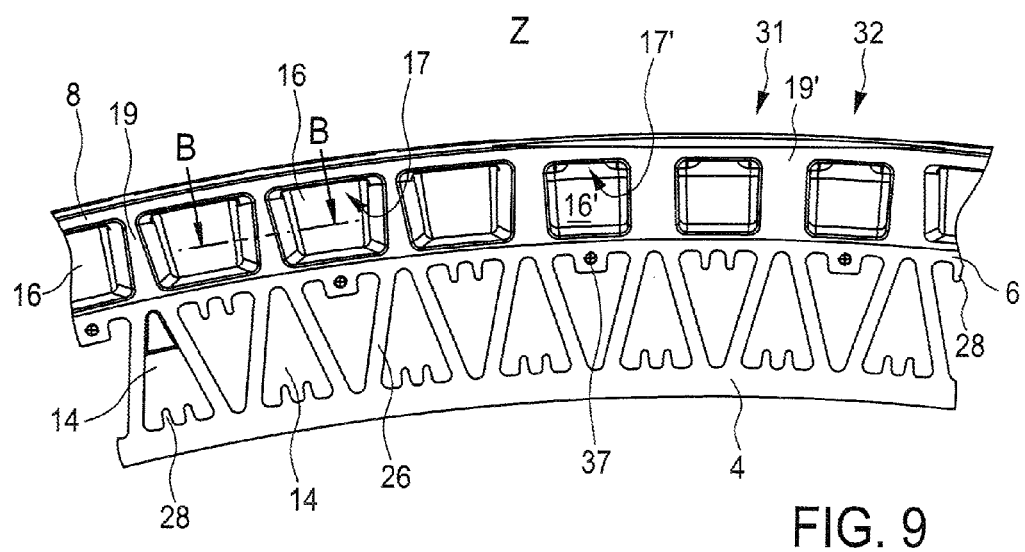
FIG. 9 shows a partial detail view of the portion Z shown in FIG. 1.

FIG. 9 shows a view directly on to the intake flow openings 17 of the passive cooling passages 16. As already shown in FIG. 7 it can be seen that the passive cooling passages 16 narrow slightly from the intake flow opening 17. That can promote the flow of wind into the intake flow openings 17. In the region of the outer fixing regions 31 and 32 respectively the passive cooling passages can be in the form of somewhat smaller passive cooling passages 16' with correspondingly reduced intake flow openings 17' in order to provide somewhat more massive intermediate walls 19 for the provision of bores, in particular with a screwthread. The intermediate walls 19 which do not have any bores can be somewhat narrower in order thereby to provide more space for a larger passive cooling passage 16.

Figure 10:
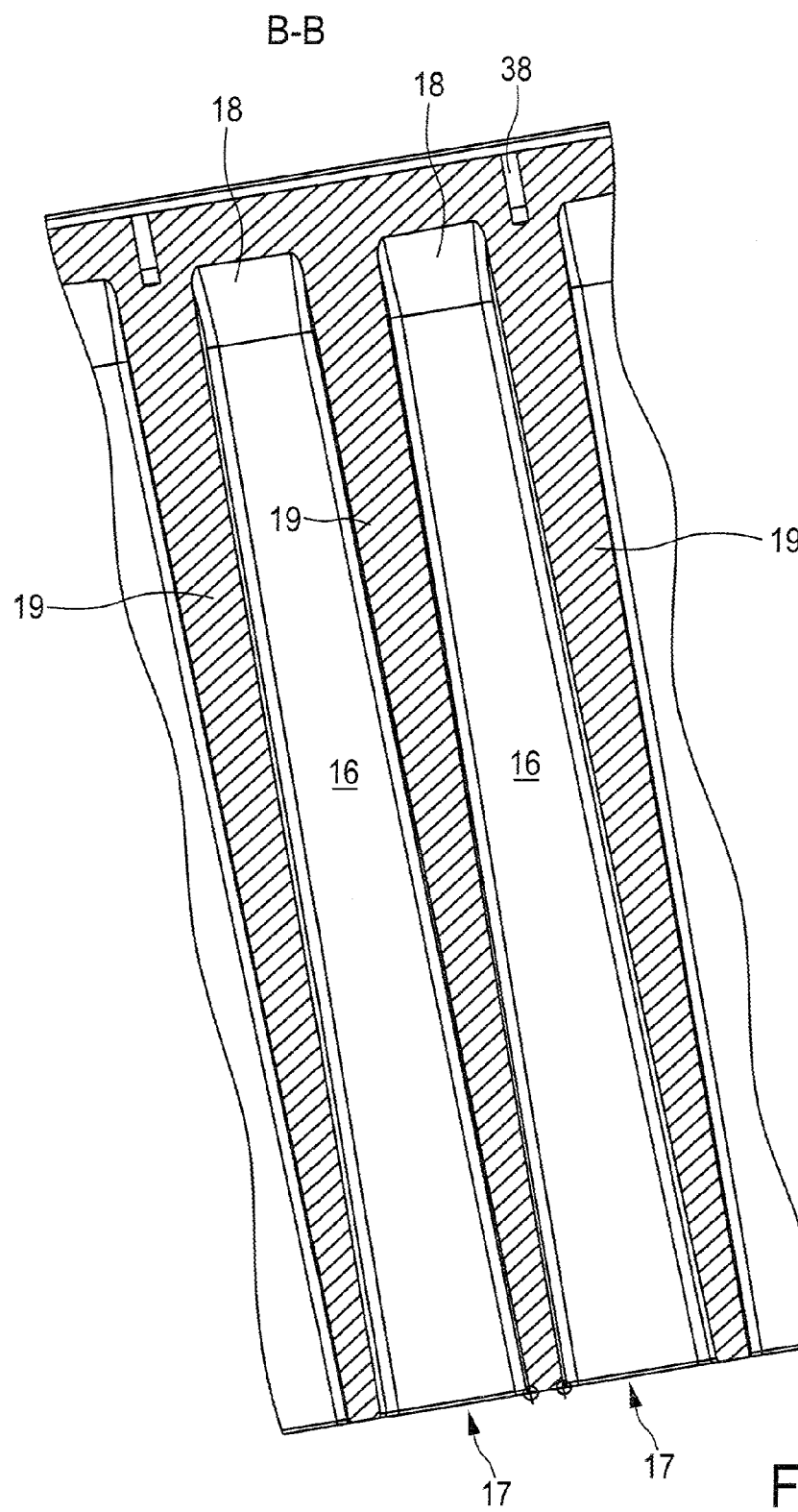
FIG. 10 shows a cross-sectional view of a section through two cooling passages taken along line B-B of FIG. 9.

The sectional view in FIG. 10 provides a view on to cut-open passive cooling passages 16. Once again the taper of the passive cooling passages 16 from the intake flow opening 17 to the outlet flow openings 18 is shown here. The gauge of the intermediate walls 18 correspondingly increases in the same direction.

Figure 11:
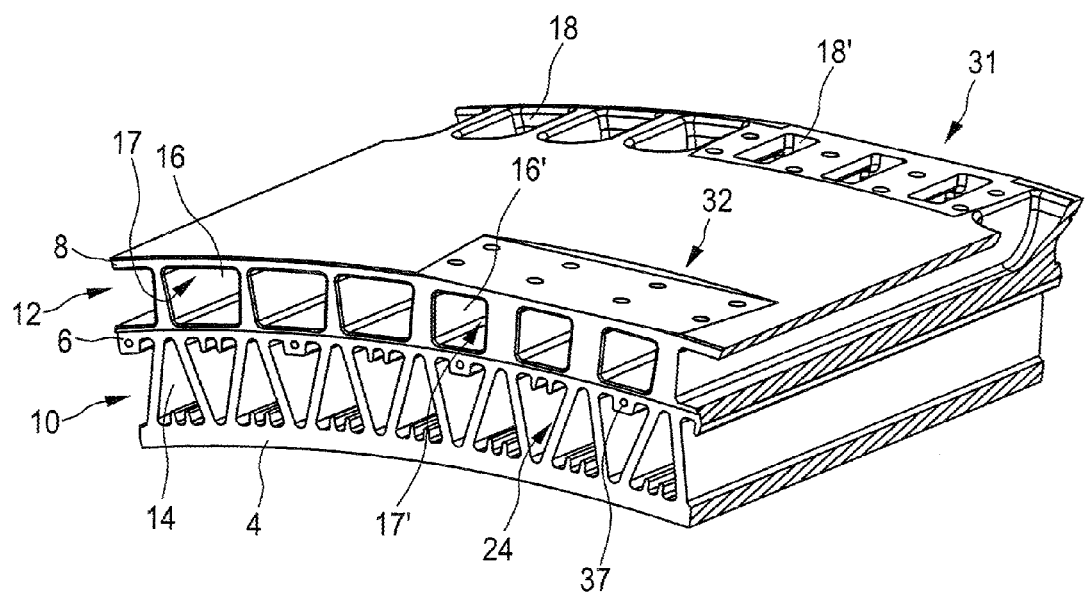
FIG. 11 shows a perspective view of the portion Z shown in FIG. 9.

The perspective view of the portion shown in FIG. 11 illustrates in the foreground the outlet region 24 of the active cooling passages 14 and also the intake flow openings 17 and 17' of the passive cooling passages 16 and 16'. The leeward and windward external fixing region 31 and 32 respectively is arranged on the outer carrier ring 38 in the region of the somewhat narrower passive cooling passages 16'. Smaller outlet flow openings 18' are correspondingly provided.

The external fixing regions 31 and 32 respectively are each provided at locations on the stator ring 2, that are arranged in mutually opposite relationship, that is to say arranged displaced through 180°, as can be seen in FIG. 1 at the two by three somewhat reduced intake flow openings 17' at the 12 o'clock and 6 o'clock positions. A plan view of the one location is shown in FIG. 12, accordingly the leeward external fixing region 31 has eight leeward bores 41 whereas the windward external fixing region 32 has eight windward bores 42.

Figure 14:
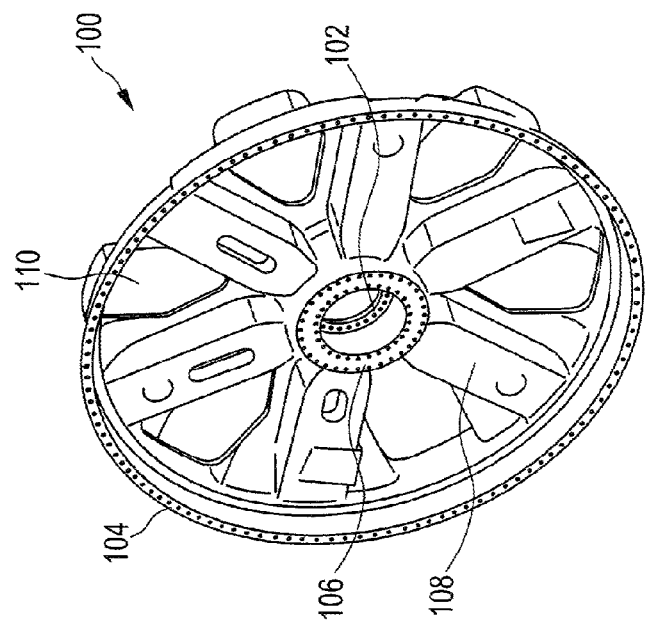
FIG. 14 shows a further perspective view of the stator bell of FIG. 13.
Figure 15:
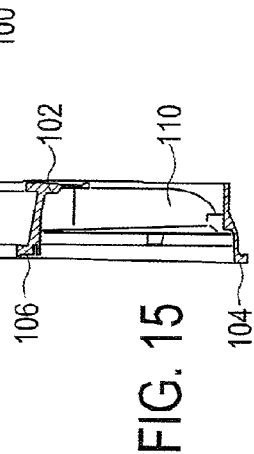
FIG. 15 shows a cross-sectional side view of the stator bell of FIGS. 13 and 14.
Figure 13:
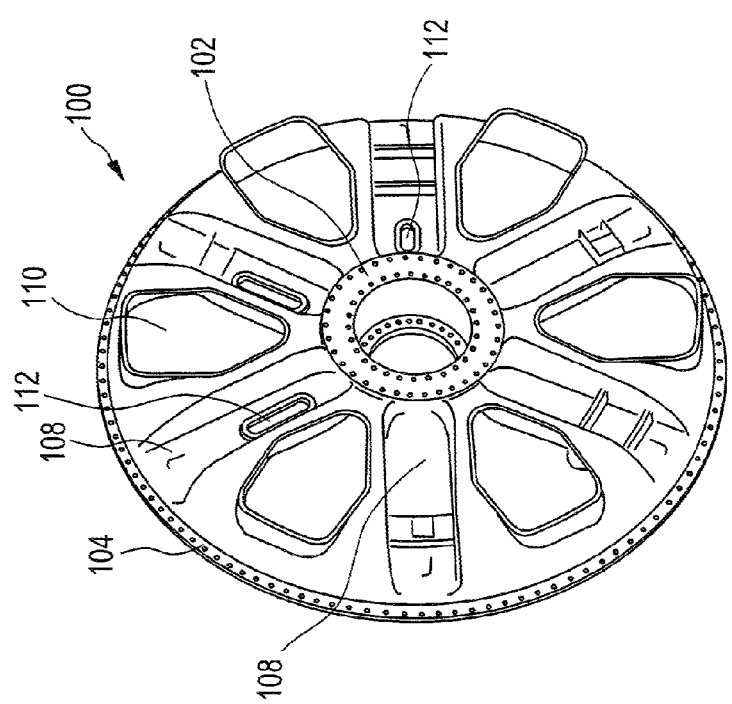
FIG. 13 shows a stator bell, according to one embodiment, in the form of a stator bell as a perspective view from the exterior with respect to a pressure chamber.

The stator bell 100 in FIGS. 13 to 15 includes a machine carrier fixing 102, a stator ring fixing 104 and a trunnion fixing 106. The machine carrier fixing 102, the stator ring fixing 104 and the trunnion fixing 102 are each in the form of a circular fixing flange each having one or two peripherally extending rings of holes.

Six carrier portions 108 extend from the machine carrier fixing 102 approximately in a star-shaped configuration to the stator ring fixing 104. The carrier portions 108 are in the form of carrier arms 108 to be able to carry the force due to the weight of a stator fixed to the stator ring fixing 104 and to be able to transmit it to a machine carrier by way of the machine carrier fixing 102.

The regions between the carrier portions 108 are respectively spanned over by plate-like portions, with respective fan openings 110 being provided therein. In addition auxiliary openings 112 are provided in some carrier portions 108.

In addition provided in the region of the trunnion fixing 106 is an opening which however is closed by fixing of a trunnion in the appropriate fashion.

Thus the entire stator bell 100 is closed by closing the fan openings 110, in particular by means of fans, and the auxiliary openings 112. By virtue of fixing a stator to the stator ring fixing 104 and the provision of a corresponding rotor, a pressure chamber can be formed between that stator and the rotor on the one hand and the stator bell 100 on the other hand, and can be subjected to pressure. The air can escape through openings in the rotor-stator arrangement, such as for example the air gap, and in that case leads to an air flow in the opened regions in question.

Figure 16:
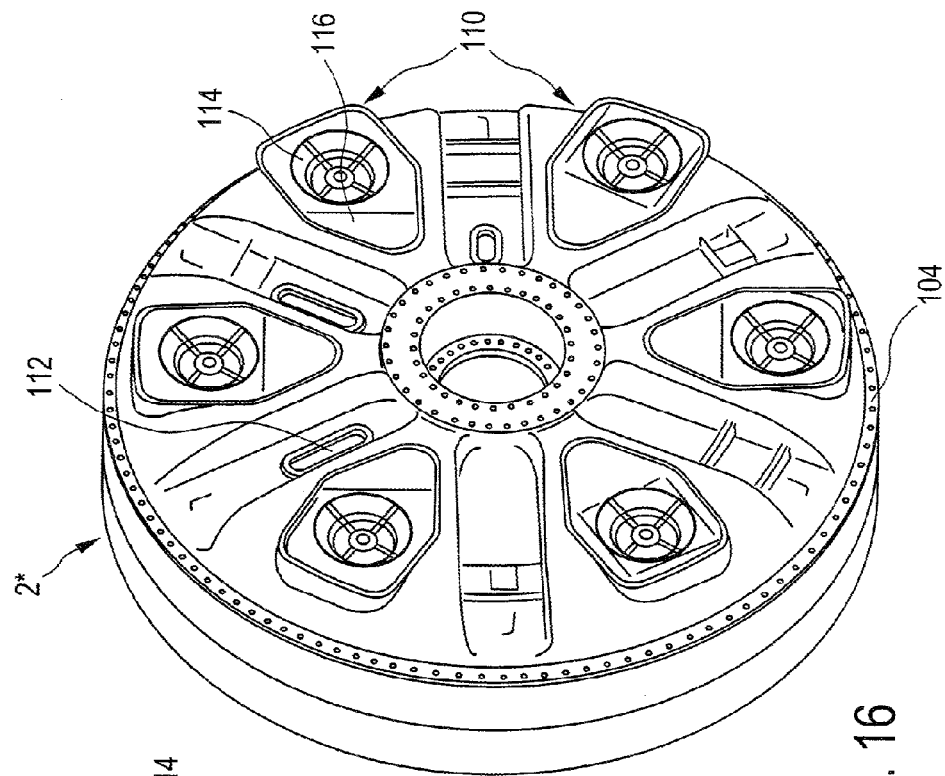
FIG. 16 shows a perspective view of a stator bell fixed to a stator ring, according to one embodiment, with installed fans.

FIG. 16 shows the stator bell 100 together with a stator ring 2\* which is fixed to the stator ring fixing 104 on the stator bell 100. In addition arranged in each fan opening 110 is a fan 114 which together with a fan cover 116 closes and covers the fan opening 110.

By bringing one or more of the fans 114 into operation air is blown into the space covered or enclosed by the stator bell 100. The air can escape through openings in the generator of which the stator ring 2\* forms a part, and provide for cooling. For that purpose the auxiliary openings 112 are also closed with a cover, although this is not shown in detail in FIG. 16. It will be appreciated that the fans 114 can also operate in such a way that they suck air out of the space covered by the stator bell 100, as shown in FIG. 16 therefore substantially towards the right and out of the plane of the drawing. Nonetheless the preferred case involves blowing into the covered space air which, with the appropriate arrangement of the stator bell 100, comes from a corresponding pod and leads to the expectation of better purity and dryness in comparison with external air from outside the pod.

Figure 17:
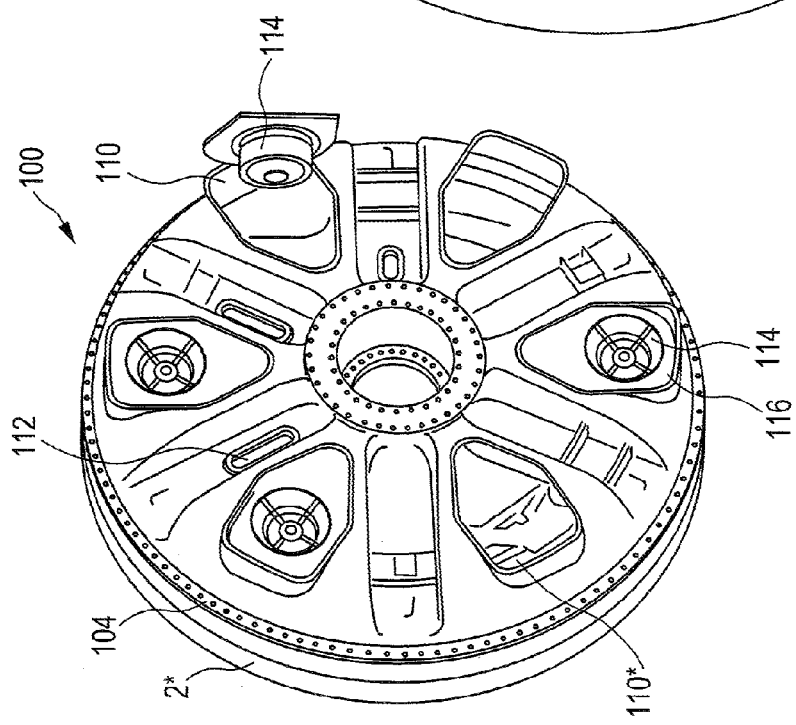
FIG. 17 shows a perspective view of a stator bell fixed to a stator ring, according to one embodiment, with four fans, of which one is partially pivoted away from its fan opening.

FIG. 17 now shows how, in accordance with an embodiment of the invention, the fan openings 110 can be used for maintenance or other purposes. For example in the case of a fan opening 110 the fan 114 is folded away by means of a hinge and the fan opening 110 is correspondingly opened. Now a person can pass through that opened fan opening 110, through the stator bell 100, more specifically through the fan opening 110 to the ring generator arranged therebehind. Equally, instead of a hinge for folding the fan 114 away, it is also possible to provide another motion mechanism. A quick-action clamping fastening can also easily be used for opening the fan opening 110. For that purpose, such a quick-action clamping fastening can be released with a few manual operations and the corresponding fan 114 can thus be removed. If a fan opening is only partially opened or if the opening is still blocked by other devices, as is shown for example at an opening 110\*, so that a person cannot climb therethrough, partial maintenance can still be considered in respect of the devices arranged immediately behind the opening. The same applies to the smaller auxiliary openings 112.

Figure 18:
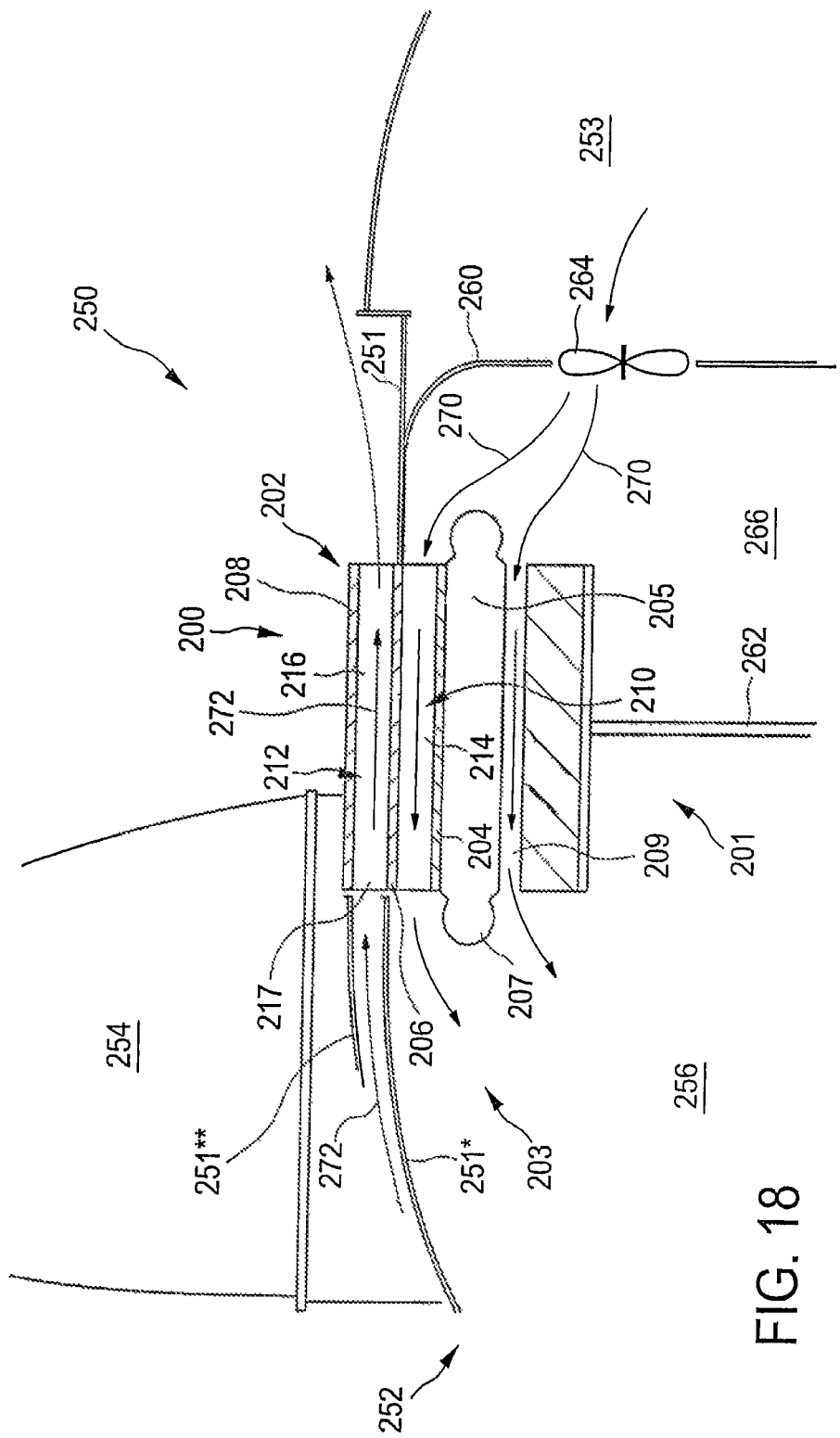
FIG. 18 shows a partial diagrammatic side view of a portion of a ring generator arranged in a pod and spinner, according to one embodiment.

FIG. 18 diagrammatically shows the overall concept according to the invention by means of an embodiment by way of example. FIG. 18 shows a partial side view of a portion of a pod 250 having a rotor assembly 252 with rotor blades 254, a ring generator 200 having a rotor 201 and a stator 203 with a stator ring 202 and a laminated core 205 with stator windings 207 which are only diagrammatically indicated. An air gap 209 is arranged between the stator 203 and the rotor 201. The stator ring 202 has an inner carrier ring 204, a central carrier ring 206 and an outer carrier ring 205. Provided between the central and outer carrier rings 206, 208 are passive cooling passages 216 forming a passive cooling portion 212. Active cooling passages 214 are arranged between the inner carrier ring 204 and the central carrier ring 206 and form an active cooling portion 210.

A stator bell 260 is fixed in the region of the central carrier ring 206 and a separating portion 262 is provided adjoining the magnetically operative part of the rotor 201. Arranged in the stator bell 260 are fans 264 which lead to an increased pressure in the pressure chamber 266 arranged substantially between the stator bell 260 and the separating portion 262. By virtue of the pressure built up in that way in the pressure chamber 266 air flows through the air gap 209 and the active cooling passages 214. The generator 200 and in particular the stator 203 is thus cooled by the air flow 270 through the air gap 209 and the active cooling passages 214.

Portions of the pod casing 251 including portions of the hub casing 251\* extend at the level of the central carrier ring 206. Thus, in relation to the pod 250 the ring generator 200 including the active cooling portion 210 is arranged within the pod 250. Only the passive cooling portion 212 and thus the passive cooling passage 216 are arranged outside the pod 250. The rotor 252 and the rotor blade 254, that is to say as shown in FIG. 18 the part at the left of the pod 250, namely the hub with the hub casing 251\* or spinner is facing into the wind in operation of the arrangement. Wind which flows to the pod 250 thus firstly flows along the hub casing 251* in the region of the rotor 252.

The pod casing 251* is lowered in a region and is thus at the same level as the central carrier ring 206. The hub casing can be at the level of the outer carrier ring 208 in the region of the rotor blade attachment, as is shown in FIG. 18 by reference 251**. FIG. 18 shows a snapshot in that respect. It should be mentioned that a rain gutter can be mounted to the stator ring 202 in the region of the central carrier ring 206 on the side towards the hub casing 251* in order to prevent the ingress of rainwater in that region and thus to protect the elements of the ring generator 200, that are arranged within the pod, from rainwater.

Then the wind passes from the region of the depressed hub casing 251* into the region of the intake flow openings 217 and to the passive and thus outer cooling portion 212 and can there flow into the passive cooling passages 216 through the intake flow openings 217 and cool the stator ring 202 in that region.

It is to be noted that the fan 264 leads to an active cooling flow 270 flowing through the air gap 209 and the active cooling passages 214. The wind results in a passive cooling flow 272 flowing through the passive cooling passages 216. It is to be noted that the active cooling flow 270 is in opposite relationship to the direction of the passive cooling flow 272. More specifically, basically the fan or fans 264 urge air out of the pod interior 253 through the stator bell 260 into the pressure chamber 266 and from there through the air gap 209 and the active cooling passages 214 outwardly in the direction of the rotor assembly hub 256 and thus in opposite relationship to the wind.

Figure 19:
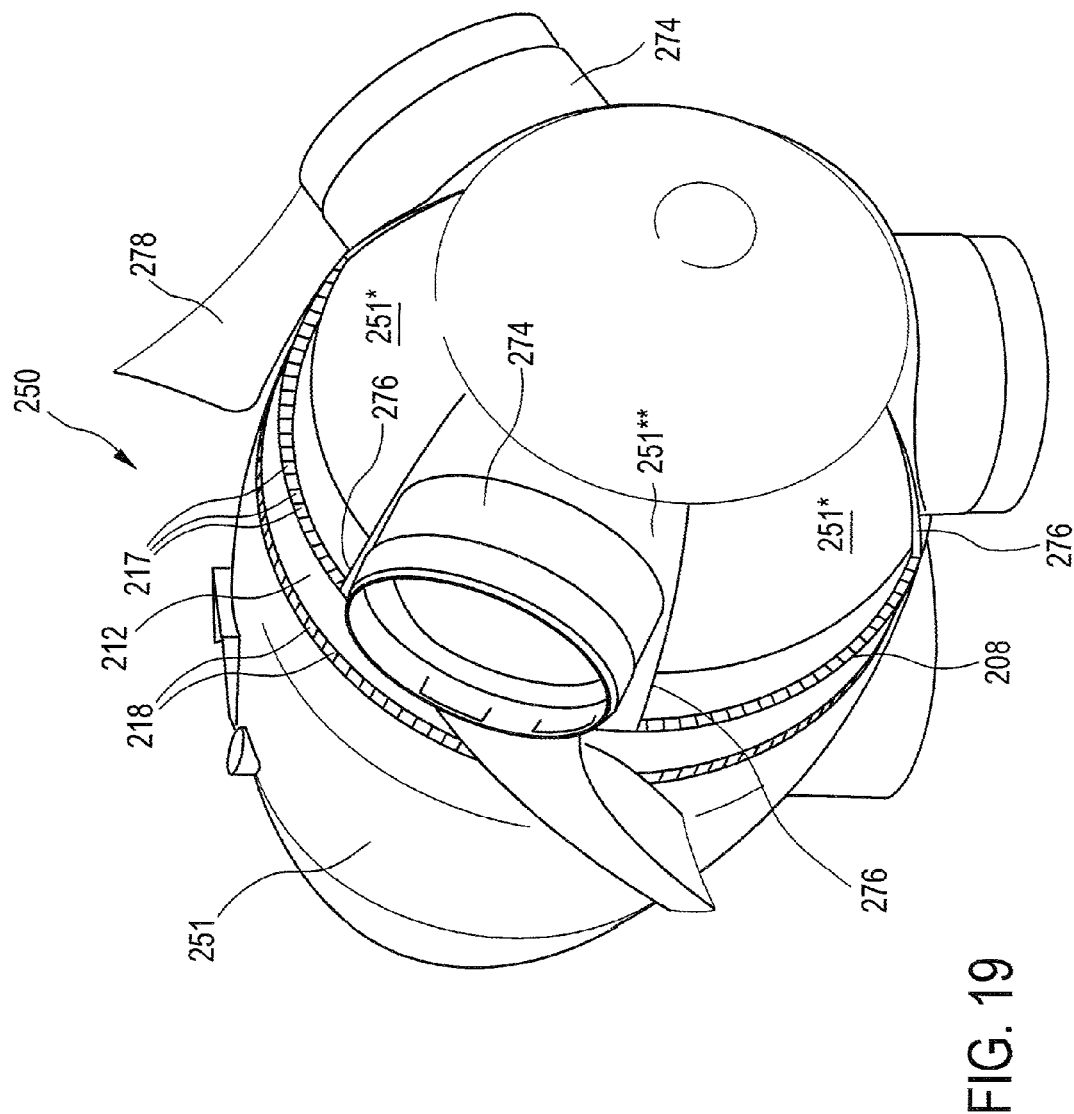
FIGS. 19 to 22 show different diagrammatic views of the pod of a wind power installation in accordance with an embodiment.

The views in FIGS. 19 to 22 diagrammatically show a pod 250. In particular a pylon, rotor assembly blades and any pod structures such as an anemometer or the like are not shown or are only basically shown. The perspective view in FIG. 19 inclinedly from the front on to the pod 250 substantially shows the pod casing 251 and the hub casing 251* and 251** respectively. In particular, it is possible to see a part of the ring of outlet openings 218 and inlet openings 217 of the passive cooling portion 212. As shown in FIG. 19 therefore in regular operation the wind comes approximately from the right into the plane of the drawing, flows along the hub casing 251 into the intake flow openings 217 through passive cooling passages in the passive cooling portion 212 and leaves the passive cooling portion 212 again in the region of the outlet flow openings 218. In that case in regular operation the wind flows approximately in the axial direction into the intake flow openings 217 while it at least partially leaves the outlet flow opening 218 directed outwardly in the radial direction.

FIG. 19 shows three rotor blade attachments 274 on the hub casing 251* and 251 respectively. Shown in the proximity thereof—in FIG. 19, in particular in regard to the rotor blade attachment 274 shown at the left—is a transitional edge 276 between the higher region of the hub casing 251 and the lower region of the hub casing 251*. The higher hub casing region 251** is approximately aligned with the outer carrier ring 208 and thus covers the intake flow openings 217. The lower region of the hub casing 251* is approximately aligned with the central carrier ring 206 so that the intake flow openings 217 can be seen in the region in question and can also be reached by the wind.

Figure 20:
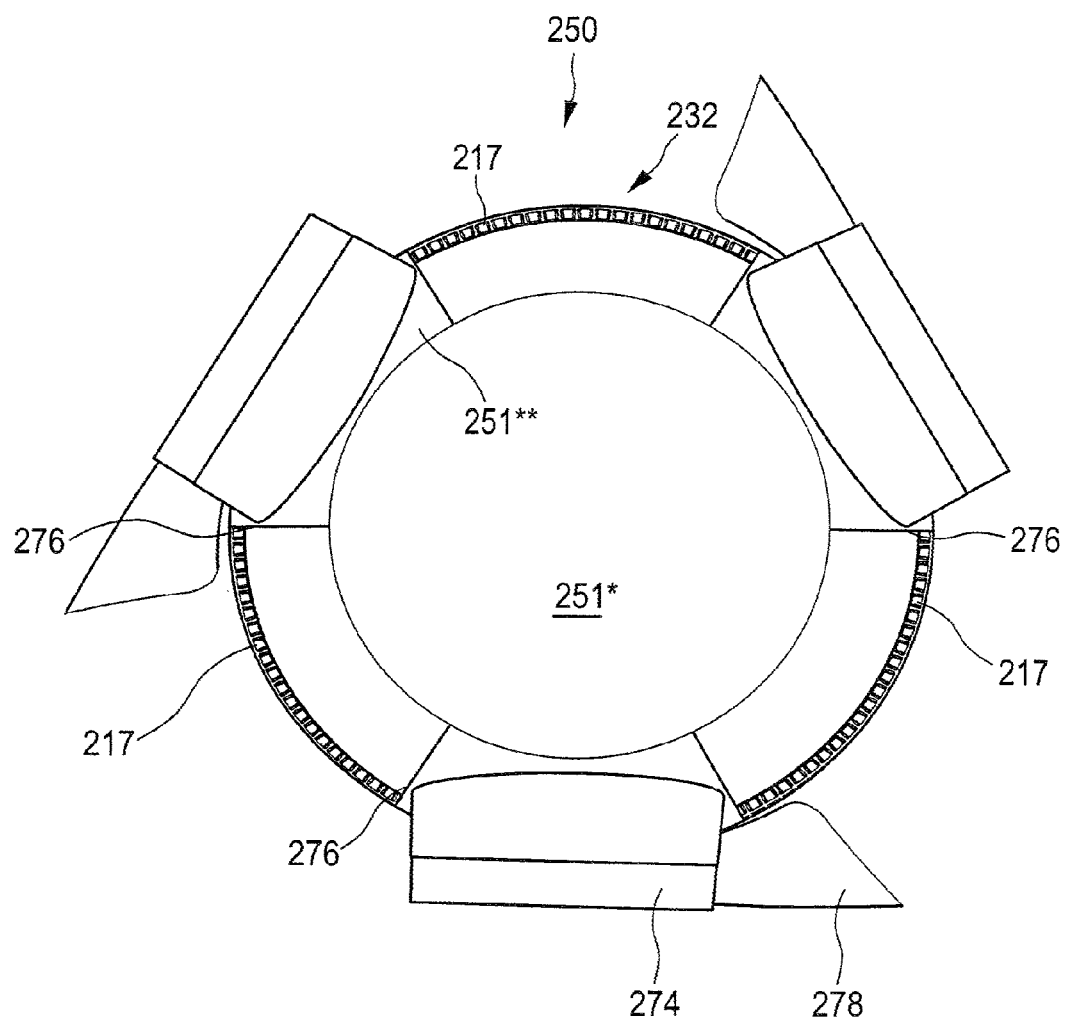
Figure 21:
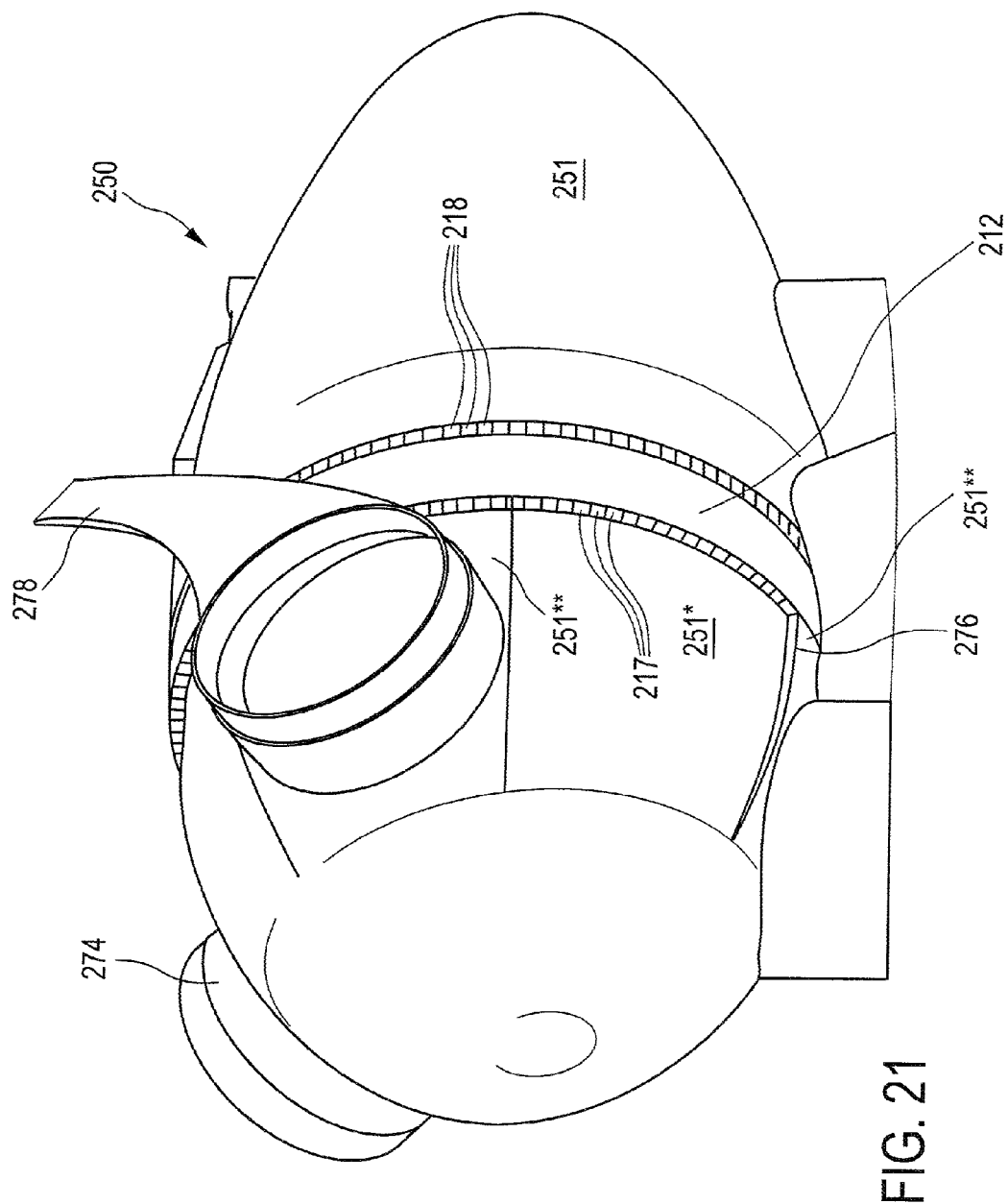
Figure 22:
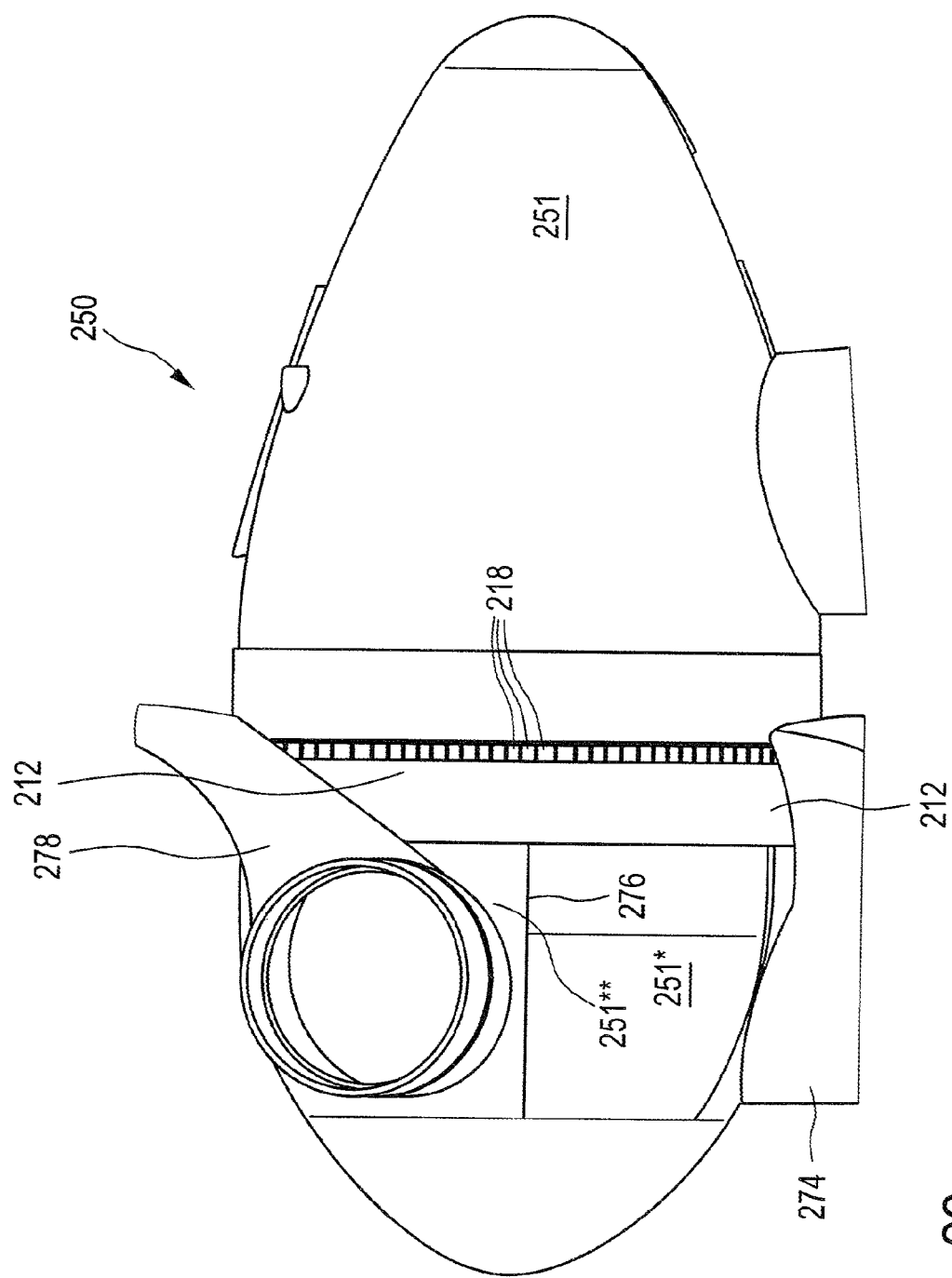

The front view on to the pod 250 in FIG. 20 substantially shows the hub casing 251* and 251** respectively and the intake flow openings 217. The perspective in FIG. 20 corresponds to the regular wind intake flow direction. In addition the windward-side external fixing region 232 is arranged at the 12 o'clock position. It will be clear from the further perspective view in FIG. 21 and the perspective side view in FIG. 22 that rotor blade portions 278 at the pod side can pass over the region of the passive cooling portion 212 and in so doing the intake flow openings 217 and the outlet flow openings 218.

The various embodiments described above can be combined to provide further embodiments. All of the U.S. patents, U.S. patent application publications, U.S. patent application, foreign patents, foreign patent application and non-patent publications referred to in this specification and/or listed in the Application Data Sheet are incorporated herein by reference, in their entirety. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A pod of a wind power installation, the pod comprising:
an interior portion;
a spinner configured to rotate;
a plurality of rotor blade attachments coupled to the spinner, the rotor blade attachments being configured to receive rotor blades, respectively; and
a gearless ring generator located in the spinner at an end portion of the spinner that separates the interior portion from the spinner, the gearless ring generator including:
a stator having a peripherally extending stator ring for receiving stator windings;
a rotor mounted rotatably relative to the stator, the rotor being coupled to a rotor blade of the wind power installation;
a stator bell connected to and covering an entire first side of the stator ring of the ring generator, the stator bell being a single piece that supports the stator ring, the stator bell including openings and providing a pressure chamber that includes air at an increased or decreased pressure relative to atmosphere;
fans located in the openings, respectively, of the stator bell, at least one of the fans being configured to rotate away from the respective openings to allow access between the interior portion of the pod and spinner; and
an air flow path that allows air to travel between the interior portion and the spinner, wherein the air flow path includes the openings in the stator bell and the pressure chamber provided by the stator bell, the air flow path further including at least one passageway that extends through the stator or between the stator and the rotor, wherein the air flow path is in fluid communication with the spinner.

2. The pod according to claim 1 wherein the at least one passageway is through an opening in the stator.

3. The pod according to claim 1 wherein the stator bell has a machine carrier fixing portion and a plurality of carrier portions that extend therefrom in a star-shaped arrangement outwardly to a second fixing portion for fixing to the stator ring, so that the stator ring can be carried by way of the carrier portions on the machine carrier fixing portion.

4. The pod according to claim 3 wherein the plurality openings are respectively arranged between adjacent carrier portions of the plurality of carrier portions.

5. The pod according to claim 1 wherein the stator bell is a metal structure.

6. A wind power installation comprising:
a pod that includes an interior portion;
a spinner configured to rotate relative to the pod;
a plurality of rotor blade attachments coupled to the spinner, the rotor blade attachments being configured to receive rotor blades, respectively; and
a gearless ring generator located in the spinner and at an end portion of the spinner that is proximate the interior portion of the pod, the gearless ring generator including:
 a stator having a peripherally extending stator ring for receiving stator windings;
 a rotor mounted inward of the stator, the rotor being rotatable relative to the stator, the rotor being coupled to a rotor blade of the wind power installation;
 a stator bell connected to and covering an entire first side of the stator ring of the ring generator, the stator bell including openings and providing a pressure chamber that includes air at an increased or decreased pressure relative to atmosphere;
 fans located in the openings of the stator bell, at least one of the fans being configured to rotate away from the respective openings to allow access between the interior portion of the pod and spinner; and
 an air flow path that allows air to travel between the interior portion and the spinner, wherein the air flow path includes the openings in the stator bell and the pressure chamber provided by the stator bell, the air flow path further including at least one passageway that extends through the stator or between the stator and the rotor, wherein the air flow path is in fluid communication with the spinner.

7. The wind power installation according to claim 6 wherein the stator bell is a single metal structure.

8. The wind power installation according to claim 6 wherein the at least one passageway is through an opening in the stator.

9. The wind power installation according to claim 6 wherein the air travels from the interior portion to the spinner in response to the fans pulling air into the pressure chamber.

10. The wind power installation according to claim 6 wherein the at least one fan being configured to rotate away is a plurality of fans configured to rotate away.

* * * * *